United States Patent [19]

Belko et al.

[11] 4,096,012
[45] Jun. 20, 1978

[54] METHOD OF FORMING A SPAR LAYUP FOR AN AERODYNAMIC ROTOR BLADE

[75] Inventors: Raymond P. Belko, MR. Blackwood, N.J.; Ed. Frank, Glenolden, Pa.

[73] Assignee: The Boeing Company, Seattle, Wash.

[21] Appl. No.: 718,520

[22] Filed: Aug. 30, 1976

[51] Int. Cl.$^2$ ............................................. B29C 17/04
[52] U.S. Cl. ................................. 156/214; 156/227; 156/459; 244/123; 416/226; 416/230
[58] Field of Search ............... 156/196, 212, 214, 227, 156/459, 189, 191, 192; 244/123, 124; 416/226, 230

[56] References Cited

U.S. PATENT DOCUMENTS

| 2,589,786 | 3/1952 | Engel et al. | 156/196 |
| 3,476,484 | 11/1969 | Brunsch | 416/230 |
| 3,649,425 | 3/1972 | Alexander | 244/123 |
| 3,713,753 | 1/1973 | Brunsch | 244/123 |
| 3,923,422 | 12/1975 | Ianniello et al. | 416/226 |
| 3,962,506 | 6/1976 | Dunahoo | 244/124 |

*Primary Examiner*—William A. Powell
*Attorney, Agent, or Firm*—Felix J. D'Ambrosio; Edwin E. Greigg; Jack D. Puffer

[57] ABSTRACT

A simplified layup mandrel with no contour or twist is utilized by the method of this invention for forming the spar member of an aerodynamic rotor blade. A fiber glass tape is wrapped (laid-up) to a desired thickness onto the simplified mandrel to form a strap as the initial step. Because of the simple design of the mandrel, the laid-up strap when removed from the mandrel has a basic U-shaped configuration with straight extending legs having substantially parallel vertically oriented faces. This strap is then placed on a forming mandrel and contoured to the desired shape either by hand or by coining in a forming die. The contoured strap is then utilized in any of the various subassemblies or final assembly of the composite aerodynamic rotor blade.

4 Claims, 4 Drawing Figures

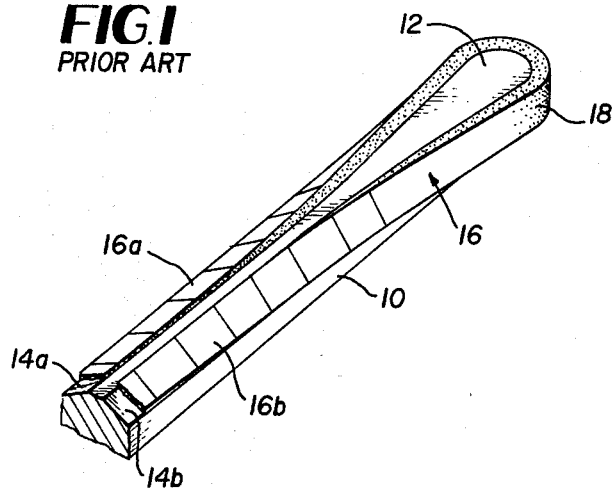
FIG.1 PRIOR ART
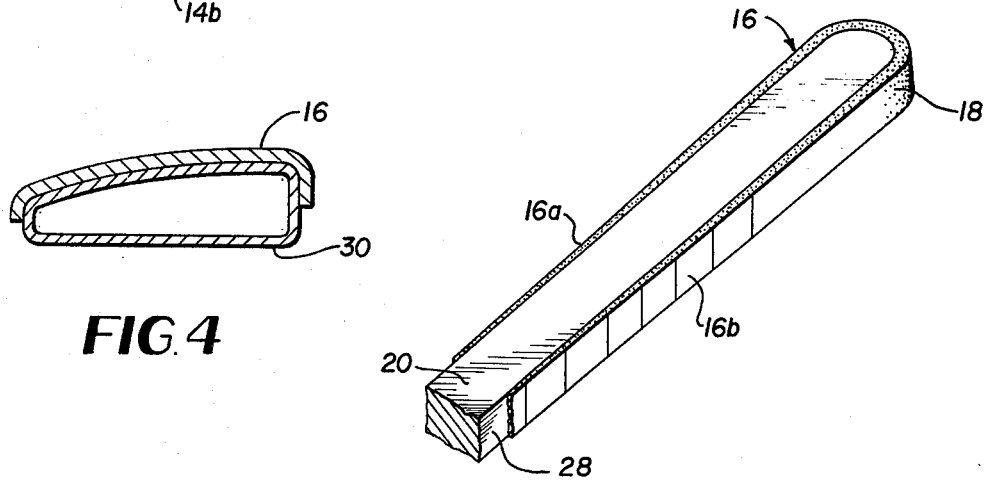
FIG.4
FIG.2
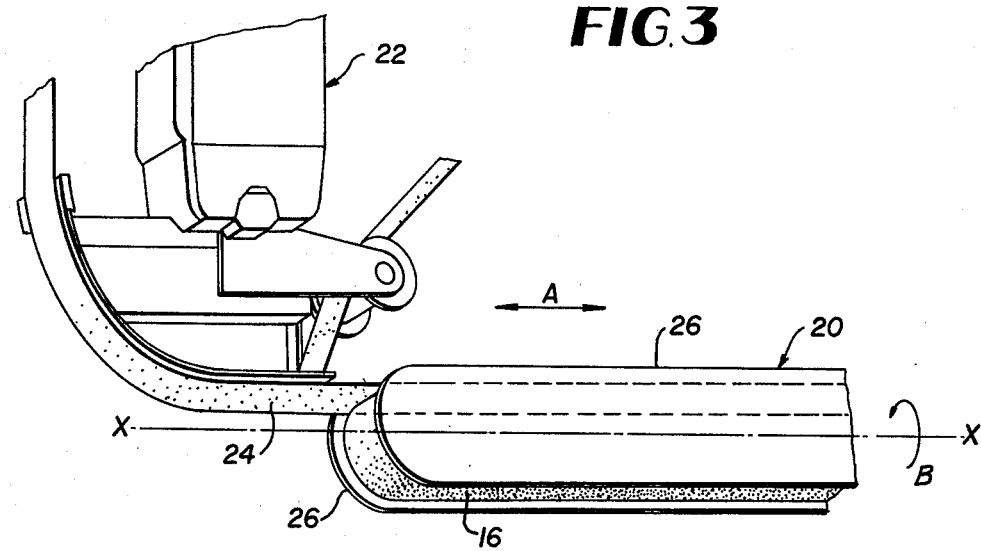
FIG.3

METHOD OF FORMING A SPAR LAYUP FOR AN AERODYNAMIC ROTOR BLADE

BACKGROUND OF THE INVENTION

This invention relates to a method of forming an element of a composite aerodynamic rotor blade, and in particular to a method of forming the spar layup of a composite aerodynamic helicopter rotor blade.

The present state-of-the-art as developed by the Boeing Vertol Company, the assignee of the present application, employs an automatic tape layup machine in the fabrication of many of the components of the composite aerodynamic rotor blade. The machine has proven to be a remarkable tool for the layup of complex components such as are found in helicopter rotor blades. It has, for example, demonstrated laminant repeatability and component quality previously unattainable.

At the present time the spar member of the rotor blade is laid-up by wrapping tape using the automatic tape layup machine onto a complex contoured mandrel around a sleeve of the root end of the blade and transitioning the tape outboard to form the airfoil contour directly on the complex contoured mandrel. According to current techniques the strap which forms the spar is formed by taking one tape, for example, 0.010 inches thick, and laying it on the complex contoured mandrel starting outboard, bringing the tape around the sleeve and back adjacent to the starting tape, and repeating this process until the required strap thickness is achieved. This operation requires wiping, twisting, and careful placement of each tape to conform to the layup mandrel. Because of these requirements, this present fabrication process is time consuming and, consequently, costly.

It would, therefore, be desirable to provide the existing state-of-the-art with a method of laying-up the spar member of the rotor blade utilizing the automatic tape layup machine which is less time consuming and less costly, while not sacrificing any of the quality features obtainable with the automatic tape layup machine.

OBJECTS AND SUMMARY OF THE INVENTION

It is, therefore, an object of the present invention to provide the existing state-of-the-art with a method of laying-up an aerodynamic rotor blade spar member using the automatic tape layup machine which requires less forming time than existing methods.

It is a related object of the present invention to provide a method which achieves the previously stated object, and in which the spar member retains the qualities of the spar member fabricated by existing methods.

These and other objects are realized according to the method of the present invention in that the simplified layup mandrel with no contour or twist is employed with the automatic tape layup machine. Initially, the spar member is formed into a U-shaped strap by the automatic tape layup machine. The simplified mandrel is mounted on the machine, and the machine forms the strap by laying-up the tape onto the mandrel to the desired thickness. The laid-up strap is then removed from the simplified mandrel at which time the laid-up strap exhibits a U-shaped configuration whose leg portions define vertically oriented parallel faces. The laid-up strap is then placed on a forming mandrel and contoured by hand to the desired air-flow shape or coined in a forming die.

Two such straps are fabricated according to the just noted procedure with each strap forming a respective upper and lower portion of the spar member. These two straps are then assembled and cured to form a structuralized spar member. The curing takes place as part of one of the composite rotor blade subassemblies or during final assembly of the composite rotor blade.

BRIEF DESCRIPTION OF THE DRAWING

FIG. 1 is a schematic illustration of a portion of a contoured layup mandrel and strap which is representative of the existing state-of-the-art. The strap was laid-up on the contoured mandrel using the automatic tape layup machine.

FIG. 2 is a schematic illustration of a simplified layup mandrel and the strap which results from the method of the present invention. Here too, the strap is laid-up using the automatic layup machine.

FIG. 3 is a schematic view of a simplified layup mandrel and the head portion of the automatic tape layup machine.

FIG. 4 is a schematic view in cross section of a forming mandrel and a formed strap layup.

DESCRIPTION OF THE PREFERRED EMBODIMENT IN GENERAL

Initially, it should be noted that the automatic tape layup machine and its operation are known, and neither the structure nor operation of this machine form a part of this invention. Accordingly, structural and operational details of the automatic tape layup machine have been omitted.

In FIG. 1 there is shown a mandrel 10 having a root end portion 12 and transition faces 14 *a, b* which begin as vertical faces at the root end and progress outboard until at their tip end they lie in a horizontal plane. This transition of the faces 14 *a, b* gives the necessary twist to the spar strap 16 laid-up on the mandrel 10 by the automatic tape layup machine so as to conform the strap in its spanwise extent to the airfoil shape of the rotor blade.

The strap 16 is formed using the automatic tape layup machine by applying tape to, for example, the tip of the surface 14*a* and proceeding from there inboard around the root end portion 12 and then outboard toward the tip of the surface 14 *b*. The tape thusly formed has legs 16 *a, b* and a root end pinwrap portion 18.

Actual spar straps are tapered in thickness along the leg portions. The tapered thickness is generated by applying progressively longer leg lengths of tape on each ply of the laminate (strap).

THE INVENTION

According to the present invention, the complex mandrel 10 of the prior art is eliminated in preference to a simplified mandrel 20 (FIG. 2). The mandrel 20 has a rectangular cross section and a generally U-shaped outer profile. With this mandrel a generally U-shaped spar strap 16 can be laid-up by the automatic tape layup machine. The strap 16 will then include legs 16 *a, b* which have parallel vertically extending faces and a root end 18 which has not yet been formed into a pinwrap. As in the prior art illustrated in FIG. 1, the tapered thickness of the strap 16 having the generally U-shaped configuration is retained.

The mandrel 20 is mounted on the automatic tape layup machine so that the placement head assembly 22 of the layup machine can layup the tape 24 onto the U-shaped profile of the mandrel 20 and in the groove formed by the U-shaped profiled surface of the mandrel and parallel end plates 26. The head assembly 22 reciprocates along the axis X—X, while the mandrel 20 rotates about the axis X—X. These motions are indicated in FIG. 3 by the arrows A and B.

Before the strap 16 is laid-up on the mandrel 22, a preferably Teflon coated stainless steel strip 28 is wrapped about the U-shaped profiled surface of the mandrel 22. The tape 24 is then laid-up directly onto the strip 28. After the layup of strap 16 is completed, one of the end plates 26 is removed as is the strip 28. Removal of the strip 28 is easily achieved without distorting the laid-up strap. Having removed the strip 28, the laid-up strap can then be removed from the mandrel, again without distortion because of the clearance provided by the removal of the strip 28. The laid-up generally U-shaped strap 16 is then either placed on a forming mandrel 30 or placed in a forming die (not shown) for contouring to the desired shape. On the forming mandrel 30, the strap 16 is contoured by hand to the shape of an airfoil portion. With the forming die, the strap 16 is also contoured to the shape of an airfoil portion by coining. The forming die is not shown for the sake of clarity and simplicity since the structural details of the forming mandrel do not form a part of the novelty of this invention.

Subsequent to contouring on the forming mandrel or in the forming die, the strap 16 is mounted on an assembly mandrel (not shown) such as an air bag mandrel. Two such straps are mounted in a complimentary fashion to complete the spar layup. Here, again, the assembly mandrel is not shown since it is well known.

The assembled spar is then cured to form a structuralized member. The curing takes place as part of one of the composite rotor blade subassemblies or during final assembly of the composite rotor blade.

The procedure outlined above and defined in the following claims has proven advantageous in that it simplifies the tape layup, reduces the layup time, simplifies programming of the tape paths using the automatic tape layup machine, and requires the utilization of fewer machine axes and auxiliary functions, all of which amounts to a significant cost reduction in the production of composite rotor blades.

What is claimed is:

1. A method of forming a spar layup for an aerodynamic rotor blade including the steps of:
   a. laying-up a continuous tape strand onto an elongated mandrel to form a generally U-shaped strap of a given thickness, with leg portions having parallel generally vertically disposed faces;
   b. removing the strap from the mandrel;
   c. contouring the leg portions of the strap to a desired airfoil portion;
   d. repeating steps a-c to form a further generally U-shaped contoured strap; and
   e. mounting both straps onto an assembly mandrel to form complementary portions of the spar layup.

2. The method as defined in claim 1, wherein each strap is contoured to the desired airfoil shape by hand on a forming mandrel.

3. The method as defined in claim 1, wherein each strap is contoured to the desired airfoil shape by coining in a forming die.

4. The method as defined in claim 1, further including the steps of:
   f. surrounding the mandrel on which the strap is formed with a correspondingly U-shaped removable strip against which the continuous tape strand is layed-up;
   g. removing the removable strip from the mandrel and formed strap prior to removing the strap.

* * * * *